Dec. 19, 1933.   C. NORDMANN   1,940,503

COLOR REPRODUCTION

Filed March 15, 1930

Patented Dec. 19, 1933

1,940,503

UNITED STATES PATENT OFFICE 1,940,503

COLOR REPRODUCTION

Charles Nordmann, Paris, France

Application March 15, 1930, Serial No. 436,064, and in France October 1, 1929

8 Claims. (Cl. 88—24)

The conditions necessary for correctly obtaining and projecting reproductions of ordinary lenticular color photographs (i. e. in which the image of the photographic filter through the posterior part of the objective is at a finite distance in the front of the photograph), have never been determined and described.

The main object of the present invention is to determine these unknown conditions.

Another object of the invention is to provide a method for producing color film reproductions by projection permitting the use of entirely different optical projecting and photographing assemblies.

Other objects will appear in the course of the detailed description now to be given with reference to the accompanying drawing in which.

Figure 1:
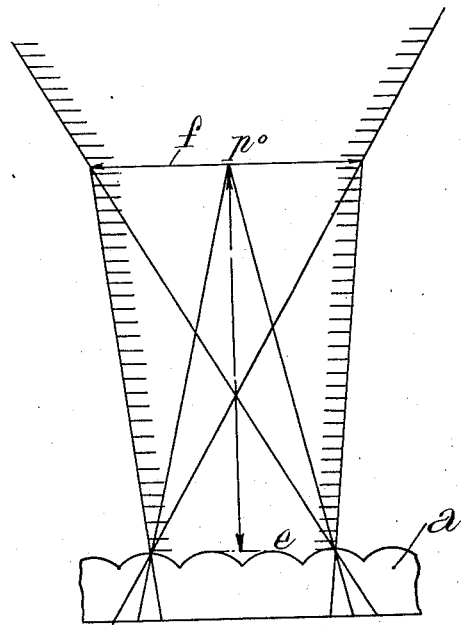
Fig. 1 is a diagram showing the formation of "elementary beams" of non diffracted rays coming in front of an ordinary lenticular photograph when illuminated from behind.

As pointed out in co-pending application Ser. No. 436,063 entitled "Color photography", bearing the same filing date, which has matured into Patent Number 1,921,258, patented Aug. 8, 1933, the conditions for proper photographing and projection in color using lenticular film are the following:

1. The axes of the "elementary beams" coming in front of the illuminated photograph $a$ should converge from points on the sensitive layer $e$ to a point at the center of the color filter $f$.

2. All the beams coming from the film should lie within the limits of the filter and traverse the objective.

When the back of a lenticular photograph is illuminated, the axes of the beams traversing each lenticular element converge at a point in front of the photograph. Each of these beams are termed "elementary beams" and the point of intersection of their axes is a fixed character of each photograph.

With these basic conditions laid down, it will now be shown (1) how correct reproductions of color photographs on lenticular film may be obtained by projection and (2) how any reproduction on lenticular film may be projected with ordinary objectives (the reproducing process described in the copending application above referred to operates by "contact" rather than by "projection").

Let $x$ represent the distance between the lenticular surface of a color photograph and the point where the axes of the elementary beams, coming from the photograph, intersect in front thereof when no optical system is interposed. Let $y$ represent the same distance for a copy or reproduction having, when no optical system is interposed, a point of intersection for the axis of its elementary beams situated in front thereof. Let X and Y represent respectively these two intersection points, whatever can be their displacements in regard to the corresponding photographs by any interposed optical system.

If an optical system be interposed between the original or a reproduction and points X and Y respectively, distances $x$ and $y$ will become $x'$ and $y'$.

Under ordinary conditions for taking colored lenticular photographs, $x$ has a certain finite value. The value of $x$ can be fixed at any desired finite distance in placing the color screen, in a suitable position previously calculated in respect to the focus of the photographic objective. With any desired camera objective, $x$ could thus be given any value between zero and infinity.

Assuming that an original color photograph has been made in which $x$ has any predetermined value. To obtain copies or reproductions "by projection" from this original without producing vicious dominants, a certain number of conditions must be taken into consideration, the latter varying (1) in accordance with the length of the auditorium in which the final projection is to be made i. e. in accordance with the focal distance of the projecting lens, (2) in accordance with the diaphragm opening of the projecting objective. The position of the color filter relatively to the projection objective may be chosen in advance provided the two fundamental conditions for proper projection above enumerated are fulfilled.

Let it be supposed that the filter is either (1) in contact exteriorly with that lens in the projecting objective nearest to the photograph to be projected or (2) in contact exteriorly with the lens furthest from the film. In the first case $y=y'$ this first case being, as is shown in my copending application, "color photography" filed this day and referred above, the most favorable projection system, in regard to the efficiency of the used objective. In the second case $y>y'$ and $x$ must be greater than the distance between the film and the rear lens of the projecting objective. When $y=y'$, the filter should be in contact with the objective lens which is just in front of the film for an objective of predetermined focal length. For an objective of similar structure and having a longer focal length, the filter will remain at the same distance from the photograph and will, therefore, be spaced further from the objective.

In brief, in order to utilize objectives of diverse focal lengths and of varying aperture such as are in current use in projecting auditoria and with maximum efficiency, it would seem advantageous to give $y$ any one of several (2 or 3 for example) fixed values. Otherwise expressed, a certain number of different copies or reproductions should be available each having a predetermined $y$ value.

This result may be obtained as follows: A convergent optical system, formed for example of two combined objectives, is centered between an original lenticular photograph and the unexposed film yielding the copy, the original and unexposed film having their lenticular surfaces positioned to face one another. If it be desired that the size of the image on the original film and the image to be produced on the unexposed film bear the relation 1:1 the distance between the objectives, the photograph and the unexposed film may be easily calculated. For, let $x$ have a predetermined value and let it be supposed that a copy be desired in which $y$ has a predetermined value. Then the focal distance $\phi$ of the single resultant objective formed by the two objectives is $$\phi = \frac{ff^1}{f+f^1-d} \quad (1)$$

where $d$ is the optical distance of the two juxtaposed objectives whose individual focal lengths are $f$ and $f^1$ respectively. In order to obtain a 1:1 size relation in the original and copy, it is necessary that the former and the latter be placed on opposite sides of the resultant objective whose foci are $F^1$ and $F^2$ (Fig. 2) at distances $2\phi$ from the corresponding principal planes.

It is easy to see that in order that $y$ have a finite value and that Y be in front of the sensitive layer at a finite distance $x$ must be greater than $\phi$. Moreover, according as $x$ is smaller or greater than $2\phi$, $$\frac{1}{2\phi-x} = \frac{1}{\phi} + \frac{1}{y-2\phi}$$

or $$\frac{1}{2\phi-y} = \frac{1}{\phi} + \frac{1}{x-2\phi}$$

Obviously, $y$ should be greater than or equal to $\phi$.

The above relations permit a choice of the convergent optical system to be used for reproduction by projection and the focal lengths of its constituent lenses. From relation (1) above, it will be seen that, if the convergent system is made by two combined objectives for example, the resultant focal distance $\phi$ may be modified at will by changing the distance between the two objectives, thus varying optical distance $d$. It follows then, that with any given original, different series of reproductions may be produced each having a predetermined value of $y$ i. e. the latter will be adapted to be projected in theatres having different lengths and using various types of projecting objectives.

In order to project properly and without dominants, it will suffice to place the color screen at point Y whose position may be thus fixed in advance.

Figure 2:
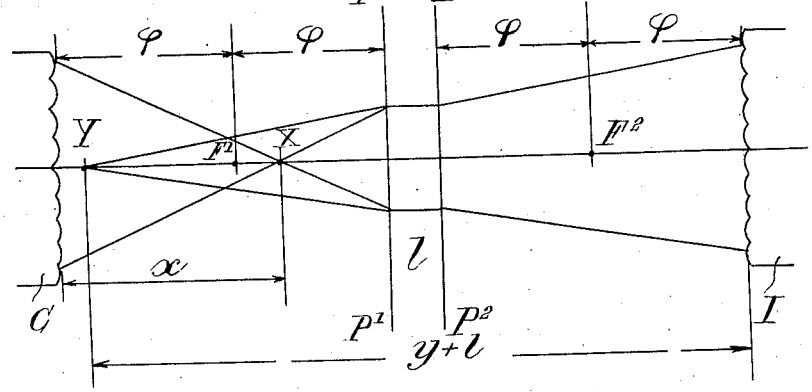
Fig. 2 is a diagram illustrating how the invention is carried out.

In Fig. 2, C is an original lenticular film in which $x$ is chosen so that $2\phi > x > \phi$. I is an unexposed film (copy) designed to have a predetermined $y$ value. $P^1$, $P^1{}_1$ and $P^2$ $P^2{}_1$ are the principal planes of the combination of a pair of reproducing objectives having a predetermined focal distance, the distance $l$ between the principal planes being chosen so that the single resultant objective satisfies the relations above developed i. e. Y is the conjugate of relatively to the resultant objective whose focal distance is $\phi$, and which is in the front of I.

While in practice reproductions made as above indicated yield correct with objective in common use images, that is not found to be as easily realized with photographs designated as "collimated", wherein $x$ and $y$ have a value of infinity. The latter require, in addition (see French Patent No. 605,875), objectives of reproduction as well as objectives of projection much more opened than those necessary in the processes described in the present application and having relatively wide apertures which are difficult to manufacture (see also my copending application referred above).

The present process differs from the "collimating" processes of the type described in the French patent above referred in that:

(1) while in collimating processes $x$ must be equal to $y$ (see page 2, line 82 and thereafter of the above patent, wherein it is stated that "if a 1:1 size reproduction is made, the diaphragm should occupy the same position as to distance and have the same angular opening relatively to the two films"), and both are equal to infinity, in the present method $x$ and $y$ are as unequal as desired and finite.

(2) in the collimating process, as set forth on page 2, lines 98 and thereafter of the French patent above cited, "the optical system is calculated so that the emerging pupil of the combination containing the last image of the color filter is at infinity or, at least, very far in front of the film". On the contrary, in the present method, the optical system is calculated so that the emerging "pupil" of the combination containing the last image of the color filter is often behind the film and at a finite distance therefrom.

In the method above described, it has been assumed that $x > \phi$ so that point Y lies in front of the film lenticulations. But by a simple variant, correct reproductions may be made even in the case where $x < \phi$, point Y lying then behind the reproducing film. It suffices to position a convergent lens in front of, and near, the film copy during projection to bring point Y in front of the lenticulations of the latter in the manner described in the inventor's copending application already referred to, and so obtain correct projection.

The present process has the advantage over the one described in the applicant's copending application Serial No. 436,063 having the same filing date which has matured into Patent Number 1,921,258, patented Aug. 8, 1933 and entitled "Color photography" that whereas, in the latter, reproduction is carried out by "contact" i. e. $y$ has a fixed value, the use of reproduction by "projection" permits any one of a number of values of $y$ to be chosen at will, thus permitting copies to be produced capable of being projected correctly and without dominants in any theater and with ordinary projecting objectives of varying focal length and aperture.

The outstanding advantages in the hereinabove described process are (1) they permit correct copies of lenticular color photographs to be obtained by projection; (2) the hitherto unknown position which the filter must occupy in order to project the copies correctly is vigorously determined; (3) the most favorable conditions for obtaining copies for projection in rooms of different lengths and with objectives of different sizes are defined; and (4) copies are obtained which may be projected with objectives of smaller aperture than those necessary for obtaining and projecting such copies made by "collimation".

What I claim is:—

1. In the method of reproducing lenticular surfaced color photographs, the steps of positioning an original lenticular surfaced photograph and an unexposed photographic element having a lenticular surface in spaced relation to one another and so that the lenticular surface of the original photograph and that of the unexposed photographic element face one another,—interposing a convergent optical system between the original photograph and the unexposed photographic element so that $y$ has a predetermined value relatively to $x$, and is finite, $x$ representing the distances between the lenticulated surface of the original photograph and the point where the axes of the elementary beams intersect when light is projected on the back of the original photograph, and $y$ representing the distance between the lenticular surface of the photographic element and the point where the axes of the elementary beams intersect when light is projected onto the back of the photographic element,—and passing a light beam through the original photograph, the optical system and the photographic element so as to expose the latter.

2. In the method of reproducing lenticular surfaced color photographs, the steps of positioning an original lenticular surfaced photograph and an unexposed photographic element having a lenticular surface in spaced relation to one another and so that the lenticular surface of the original photograph and that of the unexposed photographic element face one another,—interposing a convergent optical system between the original photograph and the unexposed photographic element so that $x$ and $y$ have finite values, $x$ representing the distances between the lenticulated surface of the original photograph and the point where the axes of the elementary beams intersect when light is projected on the back of the original photograph, and $y$ representing the distance between the lenticular surface of the photographic element and the point where the axes of the elementary beams intersect when light is projected onto the back of the photographic element,—and passing a light beam through the original photograph, the optical and the photographic element so as to expose the latter.

3. In the method of reproducing lenticular surfaced color photographs, the steps of positioning an original lenticular surfaced photograph and an unexposed photographic element having a lenticular surface in spaced relation to one another and so that the lenticular surface of the original photograph and that of the unexposed photographic element face one another,—interposing a convergent optical system between the original photograph and the unexposed photographic element so that $x$ and $y$ are finite, and $y$ is measured off in front of the lenticulated surface of the unexposed photographic element, $x$ representing the distances between the lenticulated surface of the original photograph and the point where the axes of the elementary beams intersect when light is projected on the back of the original photograph, and $y$ representing the distance between the lenticular surface of the photographic element and the point where the axes of the elementary beams intersect when light is projected onto the back of the photographic element,—and passing a light beam through the original photograph, the optical system and the photographic element so as to expose the latter.

4. A method as defined in claim 1 in combination with the step projecting from the photographic element with a color screen having its center positioned at the point of intersection of the axes of the elementary beams.

5. In the method of reproducing lenticular surfaced color photographs, the steps of positioning an original lenticular surfaced phototgraph and an unexposed photographic element having a lenticular surface in spaced relation to one another and so that the lenticular surface of the original photograph and that of the unexposed photographic element face one another,—interposing a convergent optical system between the original photograph and the unexposed photographic element so that $x$ and $y$ have different values and are being finite, $x$ representing the distances between the lenticulated surface of the original photograph and the point where the axes of the elementary beams intersect when light is projected on the back of the original photograph and $y$ representing the distance between the lenticular surface of said photographic element and the point where the axes of the elementary beams intersect when light is projected onto the back of said photographic element,—and passing a light beam through the original photograph, the optical system and the photographic element so as to expose the latter.

6. In the method of reproducing lenticular surfaced color photographs, the steps of positioning an original lenticular surfaced photograph and an unexposed photographic element having a lenticular surface in spaced relation to one another and so that the lenticular surface of the original photograph and that of the unexposed photographic element face one another,—interposing a convergent optical system between the original photograph and the unexposed photographic element so that $y$ is finite and has value relatively to $x$ determined by the following equations $$\frac{1}{2\phi-x}=\frac{1}{\phi}+\frac{1}{y-2\phi}$$

$$\frac{1}{2\phi-y}=\frac{1}{\phi}+\frac{1}{y-2\phi}$$

where $\phi$=focal length of the convergent optical system, $x$ representing the distances between the lenticulated surface of the original photograph and the point where the axes of the elementary beams intersect when light is projected on the back of the original photograph, and $y$ representing the distance between the lenticular surface of said photographic element and the point where the axes of the elementary beams intersect when light is projected onto the back of said photographic element,—and passing a light beam through the original photograph, the optical system and the photographic element so as to expose the latter.

7. In the method of reproducing lenticular surfaced color photographs, the steps of positioning an original lenticular surfaced photograph and an unexposed photographic element having a lenticular surface in spaced relation to one another and so that the lenticular surface of the original photograph and that of the unexposed photographic element face one another,—interposing a convergent optical system between the original photograph and the unexposed photographic element so that $x$ and $y$ are finite, and $y$ is measured off behind the lenticulated surface of the unexposed photographic element, $x$ representing the distances between the lenticulated surface of the original photograph and the point where the axes of the elementary beams intersect when light is projected on the back of the original photograph, and $y$ representing the distance between the lenticular surface of photographic element and the point where the axes of the elementary beams intersect when light is projected onto the back of photographic element,—and passing a light beam through the original photograph, the optical system and the photographic element so as to expose the latter.

8. A method as defined in claim 7 in combination with the step of projecting said photographic element with an optical projecting system designed to bring the point of intersection of the axes of the elementary beams in front of the lenticular reproduction.

CHARLES NORDMANN.